United States Patent
She (10) Patent No.: US 8,297,674 B2
(45) Date of Patent: Oct. 30, 2012

(54) VEHICLE INTERIOR TRIM PANEL

(75) Inventor: Yimin She, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 13/359,196

(22) Filed: Jan. 26, 2012

(65) Prior Publication Data

US 2012/0119533 A1 May 17, 2012

Related U.S. Application Data

(63) Continuation of application No. 12/722,324, filed on Nov. 3, 2010.

(51) Int. Cl.
*B62D 6/00* (2006.01)

(52) U.S. Cl. .................. 296/1.02; 296/214

(58) Field of Classification Search ............ 296/1.02, 296/146.7, 214, 1.08, 187.03; 16/110.1, 16/446

See application file for complete search history.

(56) References Cited

U.S. PATENT DOCUMENTS

| | | | |
|---|---|---|---|
| 4,373,153 A * | 2/1983 | Sano et al. | 340/479 |
| 4,981,323 A * | 1/1991 | Dowd et al. | 296/214 |
| 5,328,068 A | 7/1994 | Shannon | |
| 6,553,629 B2 * | 4/2003 | Grady et al. | 16/444 |
| 7,235,200 B2 | 6/2007 | Dry et al. | |
| 7,407,209 B2 | 8/2008 | Stolarczyk et al. | |
| 7,565,940 B2 | 7/2009 | Byrne | |
| 7,585,009 B2 * | 9/2009 | Longwell et al. | 296/1.02 |
| 7,611,162 B2 * | 11/2009 | Kim | 280/728.2 |
| 7,690,676 B2 | 4/2010 | Jaramillo et al. | |
| 7,775,573 B2 | 8/2010 | Lipke et al. | |
| 7,793,999 B2 | 9/2010 | O'Brien et al. | |
| 7,922,189 B1 * | 4/2011 | Dillon et al. | 280/728.1 |
| 2004/0061316 A1 | 4/2004 | Elqadah et al. | |
| 2005/0079336 A1 | 4/2005 | Dry et al. | |
| 2007/0200380 A1 | 8/2007 | Stolarczyk et al. | |
| 2007/0257499 A1 | 11/2007 | Lipke et al. | |
| 2007/0267884 A1 | 11/2007 | Failla et al. | |
| 2008/0272611 A1 * | 11/2008 | Gidcumb | 296/1.08 |
| 2009/0096193 A1 | 4/2009 | Robins | |
| 2009/0127834 A1 | 5/2009 | Hemingway | |

OTHER PUBLICATIONS

Information on Nissan 09 Model—Interior Grip Assist.

* cited by examiner

*Primary Examiner* — Lori Lyjak
(74) *Attorney, Agent, or Firm* — Global IP Counselors, LLP (57) ABSTRACT

A vehicle interior trim panel is provided with a rigid trim portion, a first flexible trim portion and a second flexible trim portion. The rigid trim portion includes a first opening and a second opening. The first flexible trim portion is attached to the rigid trim portion along an edge of the first opening. The first flexible trim portion at least partially covers the first opening. The second flexible trim portion is attached to the rigid trim portion along an edge of the second opening. The second flexible trim portion at least partially covers the second opening.

20 Claims, 10 Drawing Sheets

VEHICLE INTERIOR TRIM PANEL

CROSS-REFERENCE TO RELATED APPLICATION

This application is a continuation of U.S. patent application Ser. No. 12/722,324, filed on Mar. 11, 2010, the entire contents of which are hereby incorporated herein by reference.

BACKGROUND

1. Field of the Invention

The present invention generally relates to a vehicle interior trim panel of a vehicle body structure. More specifically, the present invention relates to a vehicle interior trim panel having an assist grip handle projecting through the trim panel.

2. Background Information

Vehicle structures are continually being improved for passenger safety. Most vehicles now include one or more airbags. Typically, an airbag includes inflatable member that when deployed creates a cushioning bag or cushioning curtain to protect a passenger or passengers during impact events. Airbags are often installed in pillar structures within certain vehicles. For example, an airbag is sometimes installed in an A-pillar of the vehicle such that when the airbag inflates a cushioning curtain is formed between the vehicle passenger and a door and/or a portion of an interior roof of the vehicle. Many vehicles include an assist grip handle to assist passengers in entering and exiting the vehicle. These assist grip handles are often mounted to portions of pillars and/or roof rails that are next to a door opening. Typically, the assist grip handles are securely mounted to metal structural elements of the vehicle body with fasteners that extend through apertures in trim panels. Trim panels are usually provided over the metal structural elements of the vehicle body with the assist grip handles projecting through the trim panels to provide an attractive appearance. When an airbag is installed beneath a trim panel with an assist grip handle projecting through the trim panel, the trim panel needs to easily release from the metal structural element of the vehicle body upon deployment of the airbag. The interface between the trim panel and the assist grip handle should be configured such that the assist grip handle does not obstruct the deployment of the airbag.

SUMMARY

In view of the state of the known technology, one aspect of the present invention is to provide an interface between a vehicle interior trim panel and an assist grip handle that desensitizes the gap condition between the vehicle interior trim panel and the assist grip handle while allowing the vehicle interior trim panel to easily release from the metal structural element of the vehicle body upon deployment of the airbag.

In order to carry out this aspect of the present invention, a vehicle interior trim panel is provided that mainly comprises a rigid trim portion, a first flexible trim portion and a second flexible trim portion. The rigid trim portion includes a first opening and a second opening. The first flexible trim portion is attached to the rigid trim portion along an edge of the first opening. The first flexible trim portion at least partially covers the first opening. The second flexible trim portion is attached to the rigid trim portion along an edge of the second opening. The second flexible trim portion at least partially covers the second opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
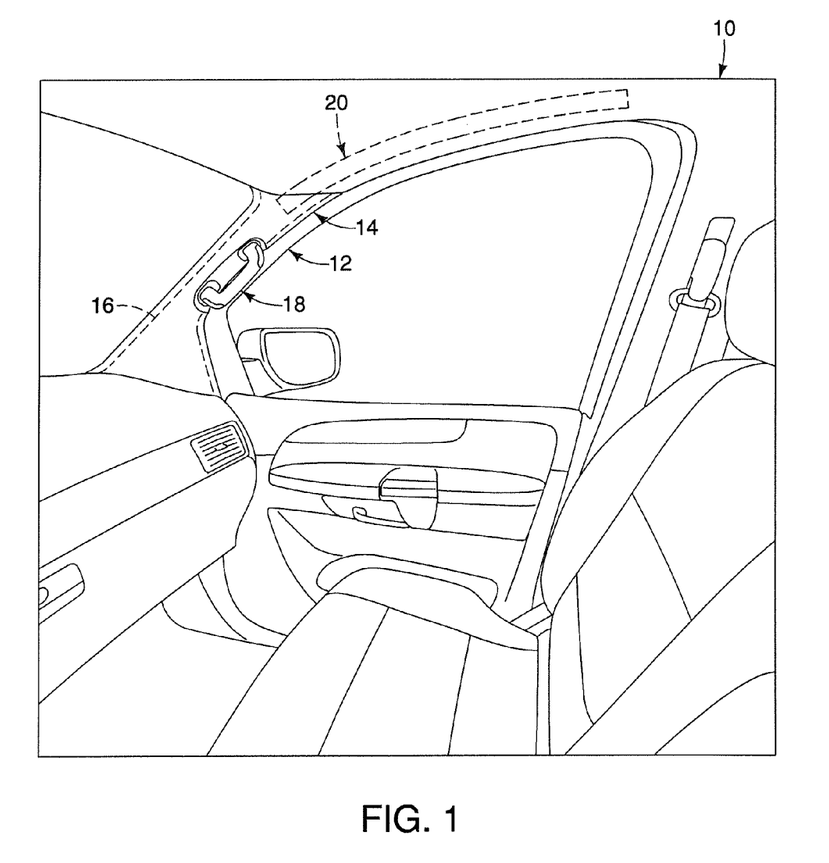
FIG. 1 is a perspective view of an interior portion of a vehicle that has a vehicle body structure with a vehicle interior trim panel and an assist grip handle in accordance with an illustrated embodiment.
Figure 2:
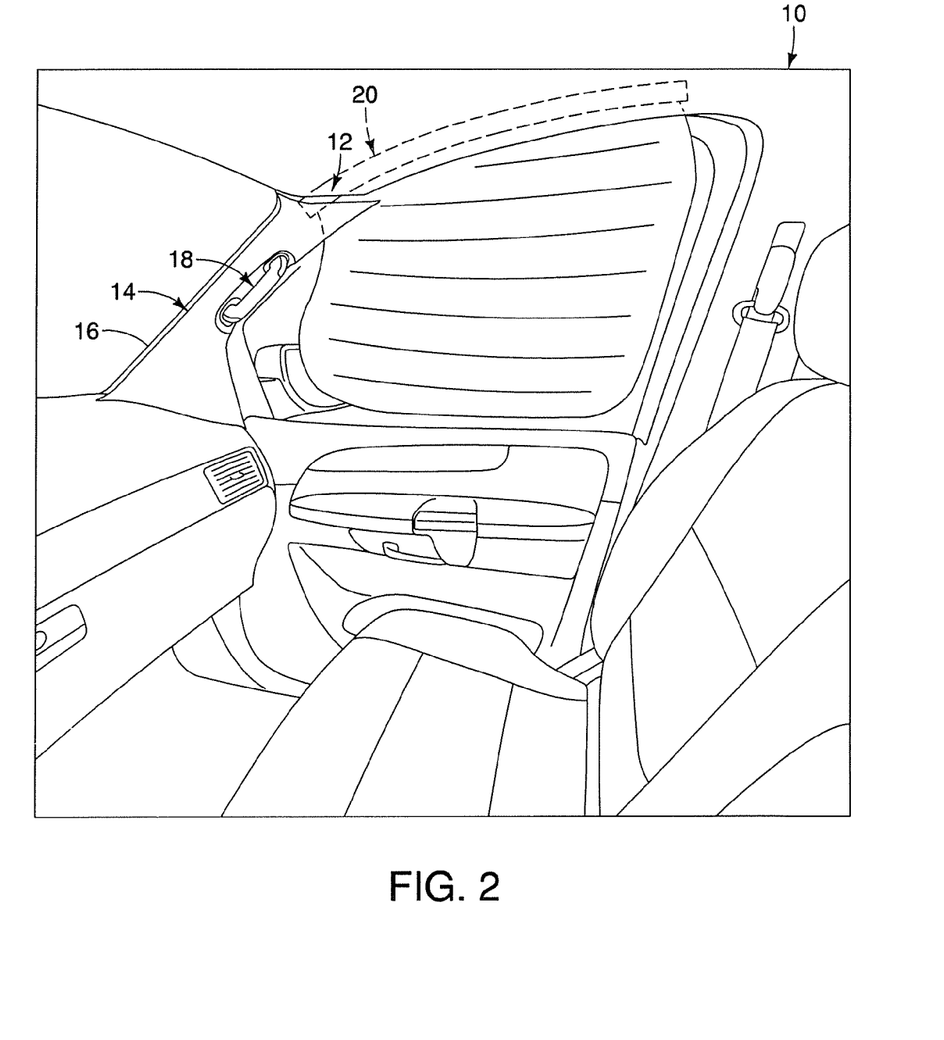
FIG. 2 is a perspective view of the interior portion of the vehicle illustrated in FIG. 1 with the airbag deployed and the vehicle interior trim panel in a detached position.
Figure 3:
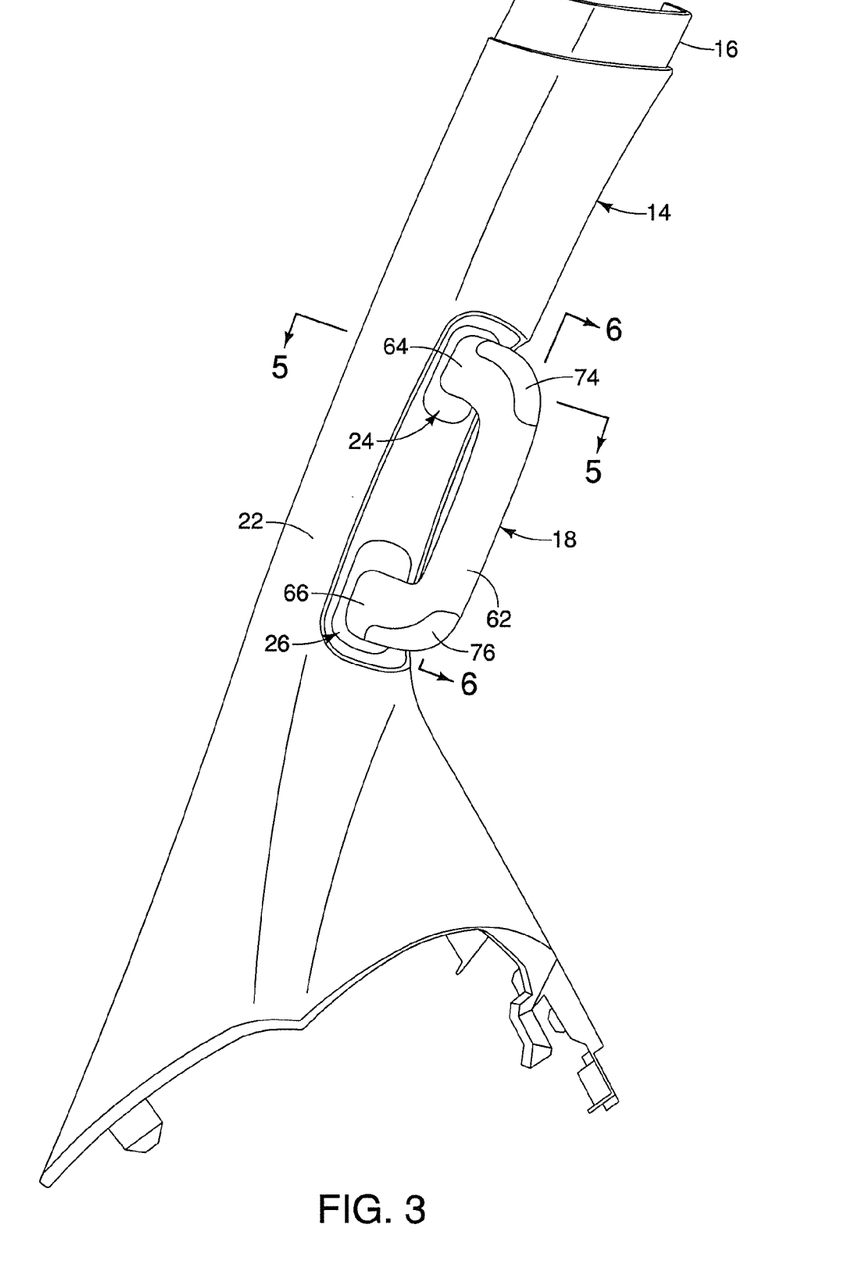
FIG. 3 is an enlarged elevational view of the A-pillar of the vehicle with the vehicle interior trim panel and the assist grip handle mounted on the A-pillar of the vehicle.
Figure 4:
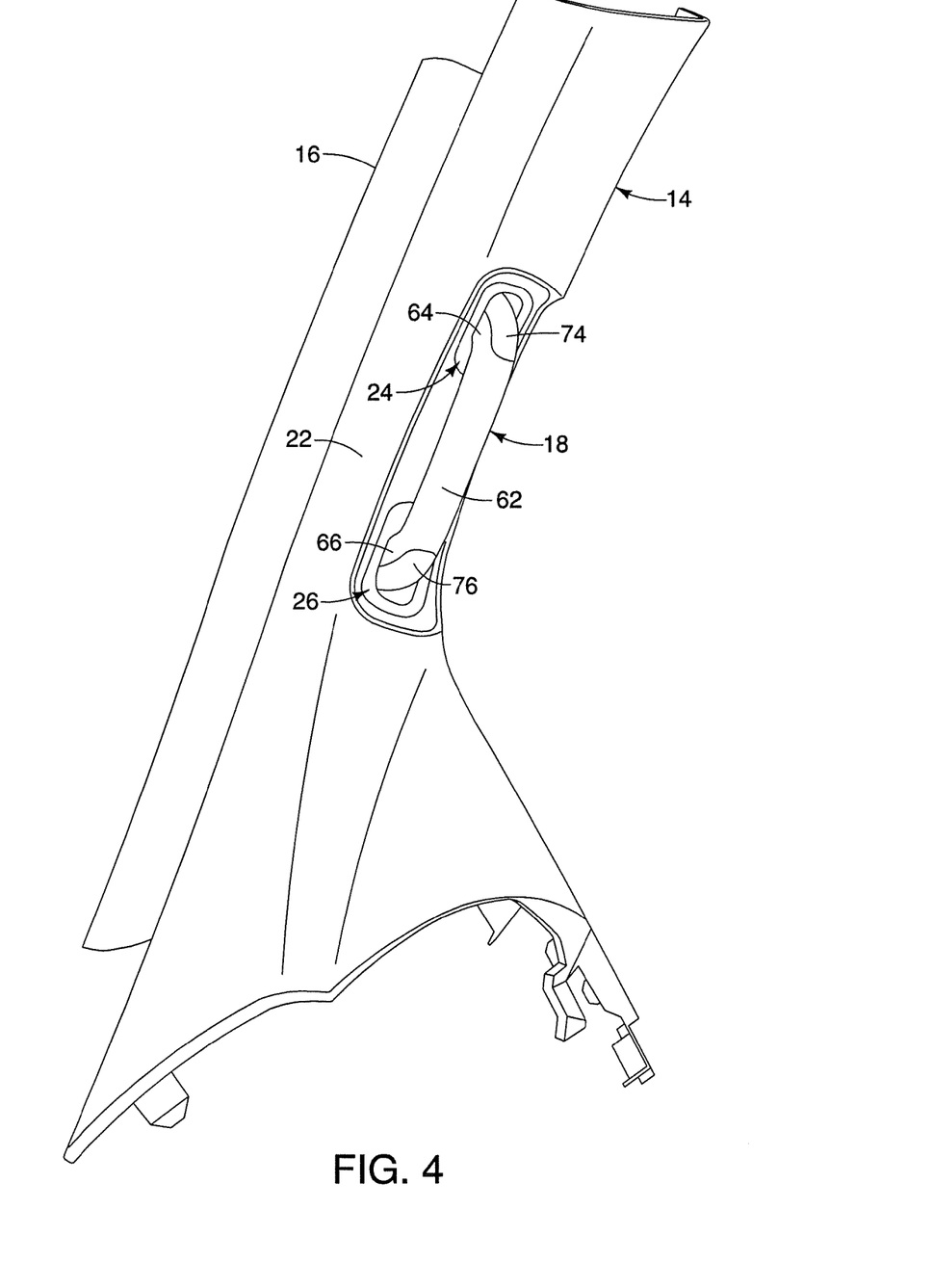
FIG. 4 is an exploded elevational view of the A-pillar of the vehicle with the vehicle interior trim panel and the assist grip handle mounted on the A-pillar of the vehicle.

Referring initially to FIGS. 1 and 2, an interior portion of a vehicle 10 is illustrated that has a vehicle body structure 12 that includes a vehicle interior trim panel 14 in accordance with an illustrated embodiment. The vehicle body structure 12 further includes a pillar 16 and an assist grip handle 18. An airbag 20 is disposed between the vehicle interior trim panel 14 and the pillar 16. In the illustrated embodiment, the assist grip handle 18 is securely attached to the pillar 16, which constitutes a structural vehicle body section of the vehicle 10 at two spaced apart locations. The trim panel 14 covers the pillar 16, the airbag 20 and the connection of the assist grip handle 18 to the pillar 16. The assist grip handle 18 provides an assist grip that helps passengers get in and out of the vehicle 10. As shown in FIGS. 1 and 2, the pillar 16 is an A-pillar of the vehicle 10. Of course, the vehicle body structure 12 can be employed in other areas of the vehicle 10. The trim panel 14 is releasably secured to the pillar 16 such that the trim panel 14 moves away from the pillar 16 in response to deployment of a concealed airbag 20. In the illustrated embodiment, the assist grip handle 18 remains attached to the pillar 16 after deployment of the airbag 20.

As seen in FIG. 1, the trim panel 14 is configured to overlay a portion of the pillar 16 and conceal the airbag 20. As seen in FIG. 2, the trim panel 14 is also configured to at least partially breakaway from the pillar 16 in response to deployment (inflation) of the airbag 20. In particular, the trim panel 14 moves away from the pillar 16 by a sufficient distance away from the pillar 16 to allow full deployment of the airbag 20. In the illustrated embodiment, the assist grip handle 18 restrains the trim panel 14 from moving away from the pillar 16 by no more than a predetermined distance.

As seen in FIGS. 3 to 8, the trim panel 14 mainly includes a rigid trim portion 22, a first flexible trim portion 24 and a second flexible trim portion 26. The first and second flexible trim portions 24 and 26 are attached to the rigid trim portion 22. The first and second flexible trim portions 24 and 26 are configured and arranged to completely cover the gaps formed between the trim panel 14 and the vehicle grip assist handle 18. Thus, with the trim panel 14 secured to the pillar 16, the first and second flexible trim portions 24 and 26 contact the vehicle grip assist handle 18 to fill any gap occurring in the interface between the assist grip handle 18 and the trim panel 14. In other words, the first and second flexible trim portions 24 and 26 constitute grip assist gap hiders that cover the gaps between the rigid trim portion 22 and the assist grip handle 18. In the illustrated embodiment, the first and second flexible trim portions 24 and 26 extend from the rigid trim portion 22 and contact the assist grip handle 18 to form a pair of 360° seal between the rigid trim portion 22 and the assist grip handle 18.

Figure 7:
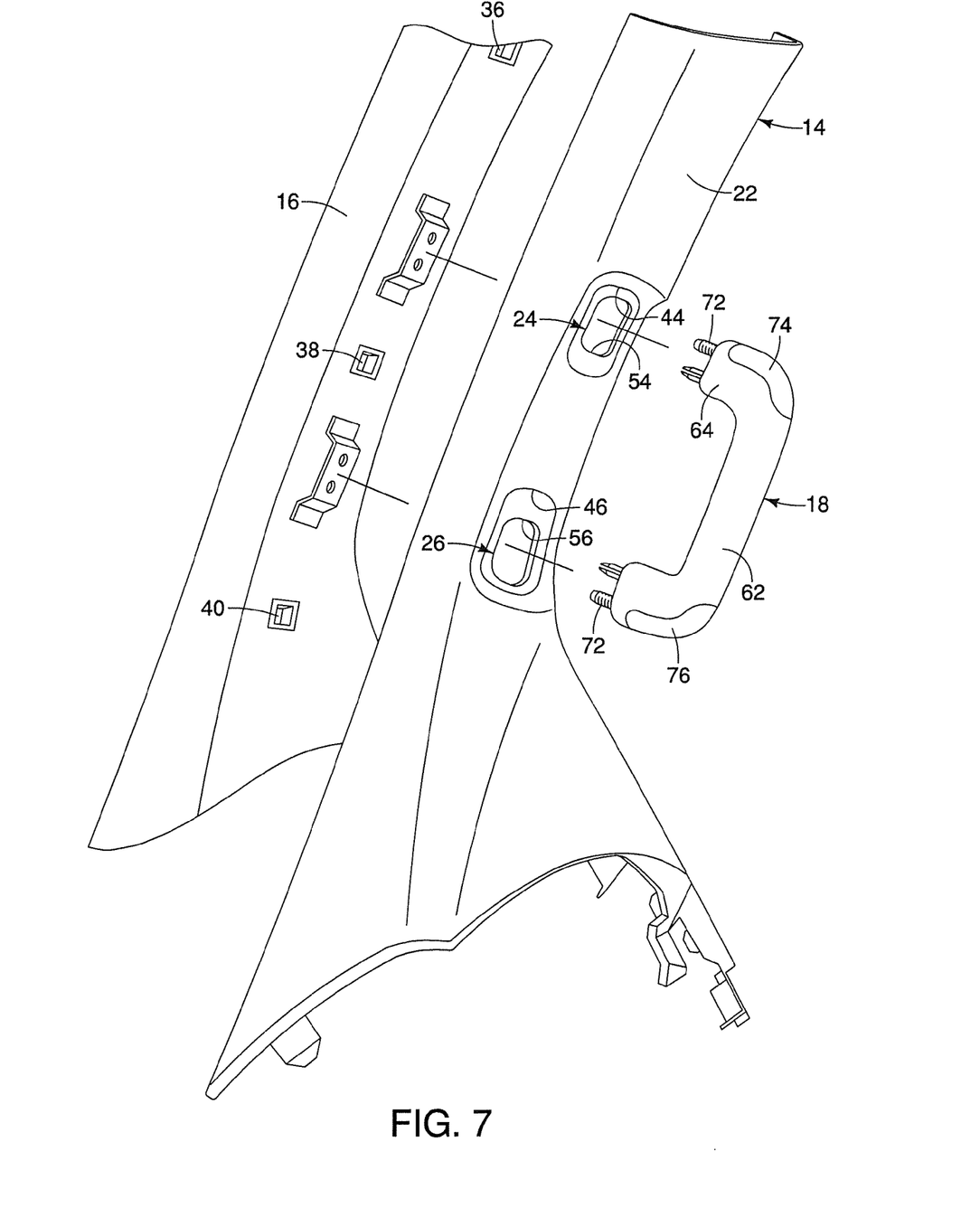
FIG. 7 is an exploded elevational view of the A-pillar of the vehicle, the vehicle interior trim panel and the assist grip handle.
Figure 8:
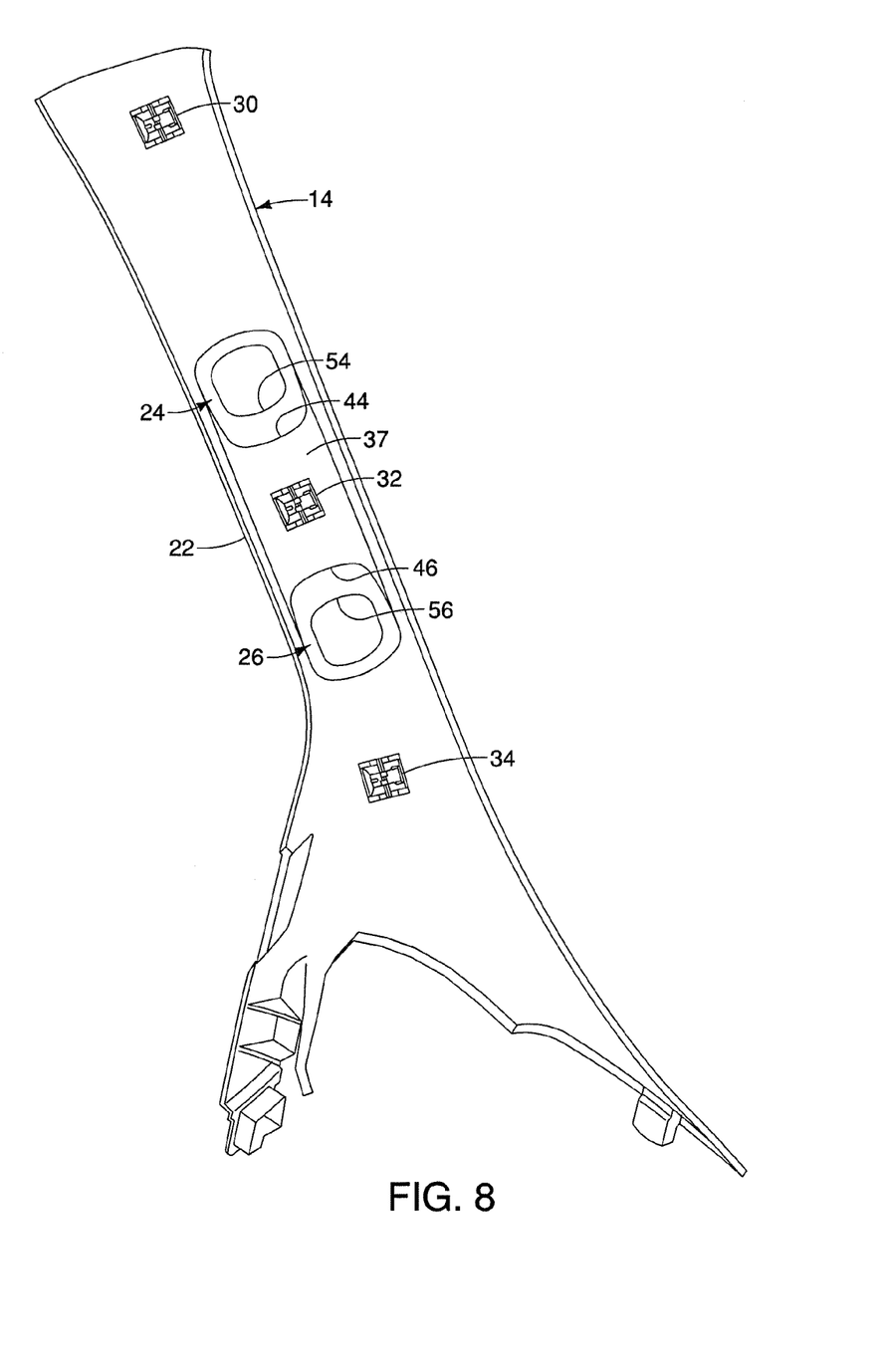
FIG. 8 is an elevational view of the hidden backside surface of the vehicle interior trim panel with the assist grip handle removed.

As best can be seen in FIGS. 7 and 8, the rigid trim portion 22 of the trim panel 14 is releasably secured to the pillar 16 by three trim clips 30, 32 and 34. The trim clip 30 engages clip mating parts 36, 38 and 40, respectively, via a snap-fit. The trim clips 30, 32 and 34 are conventional clips that release from the mating parts 36, 38 and 40, respectively, upon an application of a prescribed releasing force. When the airbag 20 is deployed, the airbag 20 applies a force that is greater than the prescribed releasing force of the trim clips 30, 32 and 34. Preferably, the trim clips 30, 32 and 34 mate with the clip mating parts 36, 38 and 40, respectively, in a reinstallable manner such that the trim panel 14 can be repeatedly removed and reinstalled without the trim clips 30, 32 and 34 and/or the clip mating parts 36, 38 and 40 becoming damaged. Since trim clips and their clip mating parts are well known in the automotive field, the trim clips 30, 32 and 34 and/or the clip mating parts 36, 38 and 40 will not be illustrated and/or discussed in detail herein.

The rigid trim portion 22 is made of a thermoplastic polymer, such as polypropylene resin. The rigid trim portion 22 has a higher rigidity than the rigidities of the first and second flexible trim portions 24 and 26. The term "rigid" as used herein does not require completely inflexibility, but rather the term "rigid" means self-supporting and maintaining its shape with or without a predetermined degree of flexibility. The rigid trim portion 22 has an overall peripheral configuration of a pillar trim panel that covers the vehicle pillar 16. The rigid trim portion 22 includes a first assist grip opening 44 and a second assist grip opening 46. As discussed below, the assist grip handle 18 projects through the first and second assist grip openings 44 and 46. The rigid trim portion 22 completely surrounds the first and second assist grip openings 44 and 46. In other words, the edges of the first and second assist grip openings 44 and 46 are each a continuous annular edge.

In the illustrated embodiment, the first and second flexible trim portions 24 and 26 are identical to each other. The first flexible trim portion 24 has a first assist grip receiving cutout 54 that is configured to receive the assist grip handle 18. Likewise, the second flexible trim portion 26 has a second assist grip receiving cutout 56 that is configured to receive the assist grip handle 18. The first and second assist grip receiving cutouts 54 and 56 are completely enclosed hole such that first and second flexible trim portions 24 and 26 are ring shaped members for receiving the assist grip handle 18 therethrough.

In the illustrated embodiment, the first and second flexible trim portions 24 and 26 are each formed of an elastomer. In other words, the first and second flexible trim portions 24 and 26 are formed of a soft pliable material such as Santoprene™. In any event, the first and second flexible trim portions 24 and 26 are more pliable than the rigid trim portion 22. In the illustrated embodiment, the rigid trim portion 22 and the first and second flexible trim portions 24 are formed using an integrated two-shot molding method in which the rigid trim portion 22 is first molded and then the first and second flexible trim portions 24 and 26 are molded directly onto the rigid trim portion 22 using an integrated mold. In other words, in this method of forming the trim panel 14, the rigid trim portion 22 is first molded with the first and second assist grip openings 44 and 46. Then the first and second flexible trim portions 24 and 26 are subsequently molded onto the rigid trim portion 22 along the edges of the first and second assist grip openings 44 and 46. Alternatively, the first and second assist grip openings 44 and 46 can be bonded to the rigid trim portion 22 by adhesive or the like.

Figure 5:
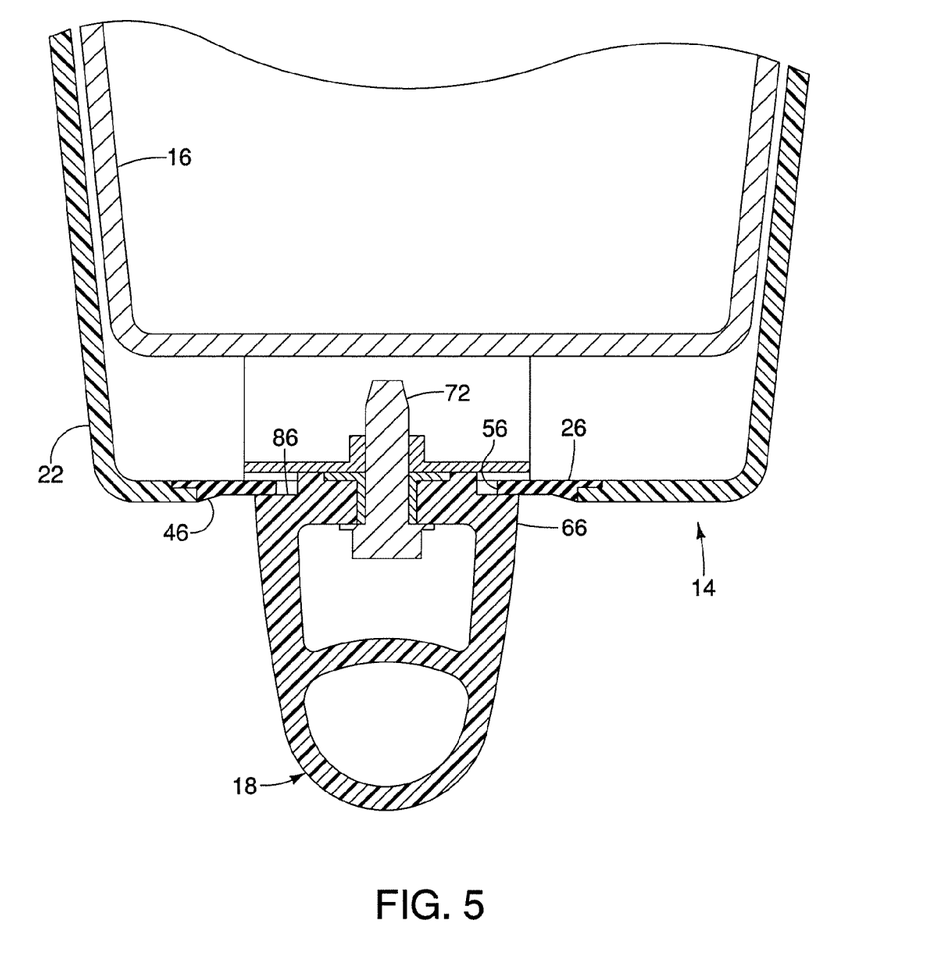
FIG. 5 is a cross sectional view of the vehicle interior trim panel and the assist grip handle as seen along section line 5-5 of FIG. 3.
Figure 6:
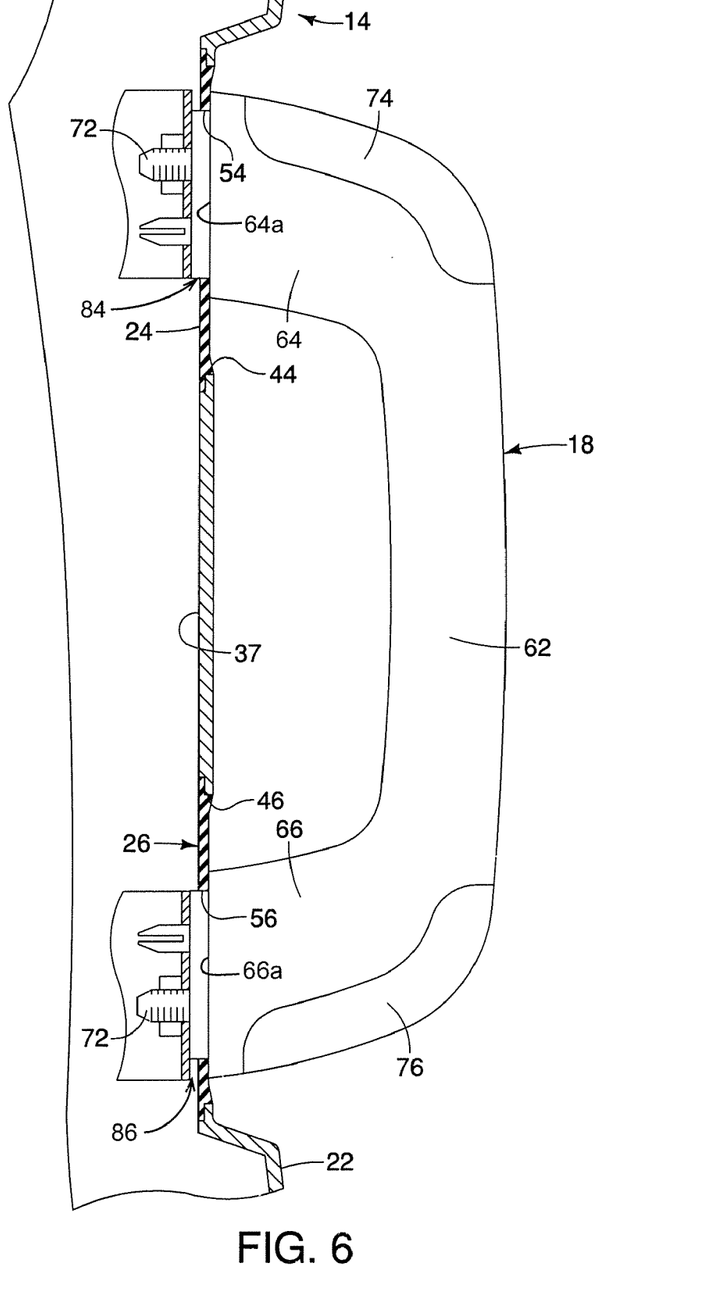
FIG. 6 is a cross sectional view of the vehicle interior trim panel and the assist grip handle as seen along section line 6-6 of FIG. 3.

The first flexible trim portion 24 is attached to the assist grip handle 18 such that the first flexible trim portion 24 at least partially overlaps or covers the hidden backside surface of the trim panel 14 adjacent to an edge of the first assist grip opening 44 of the trim panel 14. Similarly, the second flexible trim portion 26 is attached to the assist grip handle 18 such that the second flexible trim portion 26 at least partially overlaps or covers the hidden backside surface of the trim panel 14 adjacent to an edge of the second assist grip opening 46 of the trim panel 14. Thus, the first and second flexible trim portions 24 and 26 are attached to the rigid trim portion 22 directly attached on the edges of the assist grip first and second assist grip openings 44 and 46, respectively, with the first and second flexible trim portions 24 and 26 at least partially covering the first and second assist grip openings 44 and 46 of the rigid trim portion 22. As seen in FIGS. 5 and 6, each of the first and second flexible trim portions 24 and 26 has a vehicle interior side that flushly mates with a vehicle interior (exposed) side of the rigid trim portion 22 at the edges of the first and second assist grip openings 44 and 46, respectively. The term "flushly mates" as used herein does not require a perfect alignment of the exposed (vehicle interiorly facing) side surfaces at the interface between the edges of the first and second assist grip openings 44 and 46 and the first and second flexible trim portions 24 and 26. Rather, the term "flushly mates" as used herein allows for the exposed (vehicle interiorly facing) side surfaces to be offset by ± one millimeter. On the other hand, the term "is flush" as used herein requires a perfect visual alignment as viewable with the naked eye of the exposed (vehicle interiorly facing) side surfaces at the interface between the edges of the first and second assist grip openings 44 and 46 and the first and second flexible trim portions 24 and 26.

Preferably, the first and second flexible trim portions 24 and 26 are resilient members with a prescribed amount of self-supporting and shape maintaining properties. In ether words, when the trim panel 14 is removed from the pillar 16, the first and second flexible trim portions 24 and 26 will spring back to their original non-deformed (unstressed) state. In this manner, the trim panel 14 can be reinstalled on the pillar 16 after the airbag 20 has been deployed without adversely affecting the performance of the first and second flexible trim portions 24 and 26. By providing the trim panel 14 with first and second flexible trim portions 24 and 26, the difficulty of providing a tight fit at the interface of mating parts due to part variation and assembly tolerances can be solved. Also by providing the trim panel 14 with first and second flexible trim portions 24 and 26, undesirable sounds that might otherwise occur by relative movement of the trim panel 14 with respect to the assist grip handle 18 due to vibrations of the vehicle 10 can be minimized.

As seen in FIG. 7, the pillar 16 is a structural part of the vehicle body that is made one or more pieces of sheet metal. The precise construction of the pillar 16 will vary from vehicle to vehicle. Thus, the precise construction of the pillar 16 will not be described and/or illustrated in detail herein. In the drawings, the pillar 16 is depicted as an A-pillar of the vehicle 10. Typically, A-pillars are structural portions of a vehicle located between a windshield and a vehicle door. However, it should be understood from the drawings and the description herein that the vehicle body structure 12 can be employed in other areas of the vehicle 10 such as a B-pillar or other area within the vehicle 10 where the assist grip handle 18 could be provided.

Figure 9:
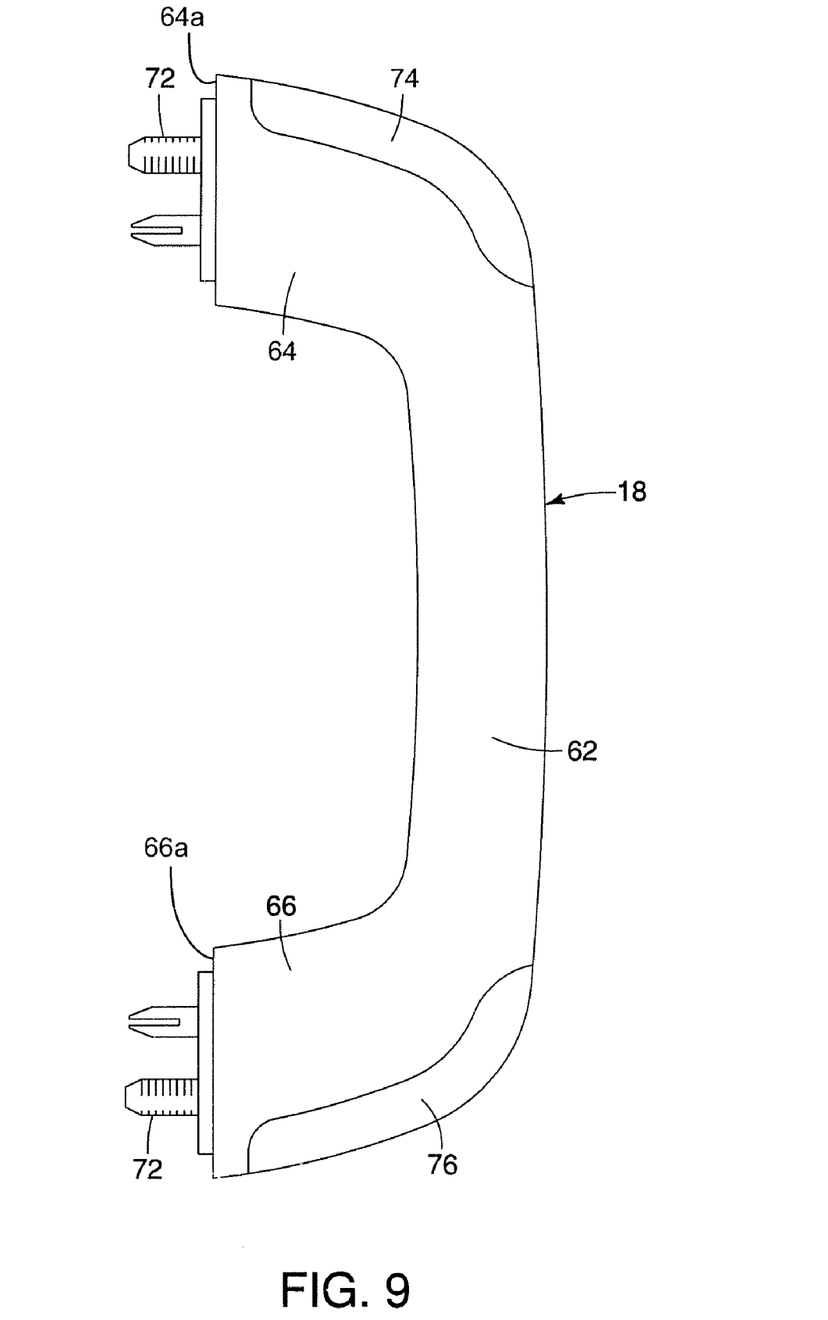
FIG. 9 is an elevational view of the assist grip handle showing the fasteners for attaching the assist grip handle to the A-pillar of the vehicle.
Figure 10:
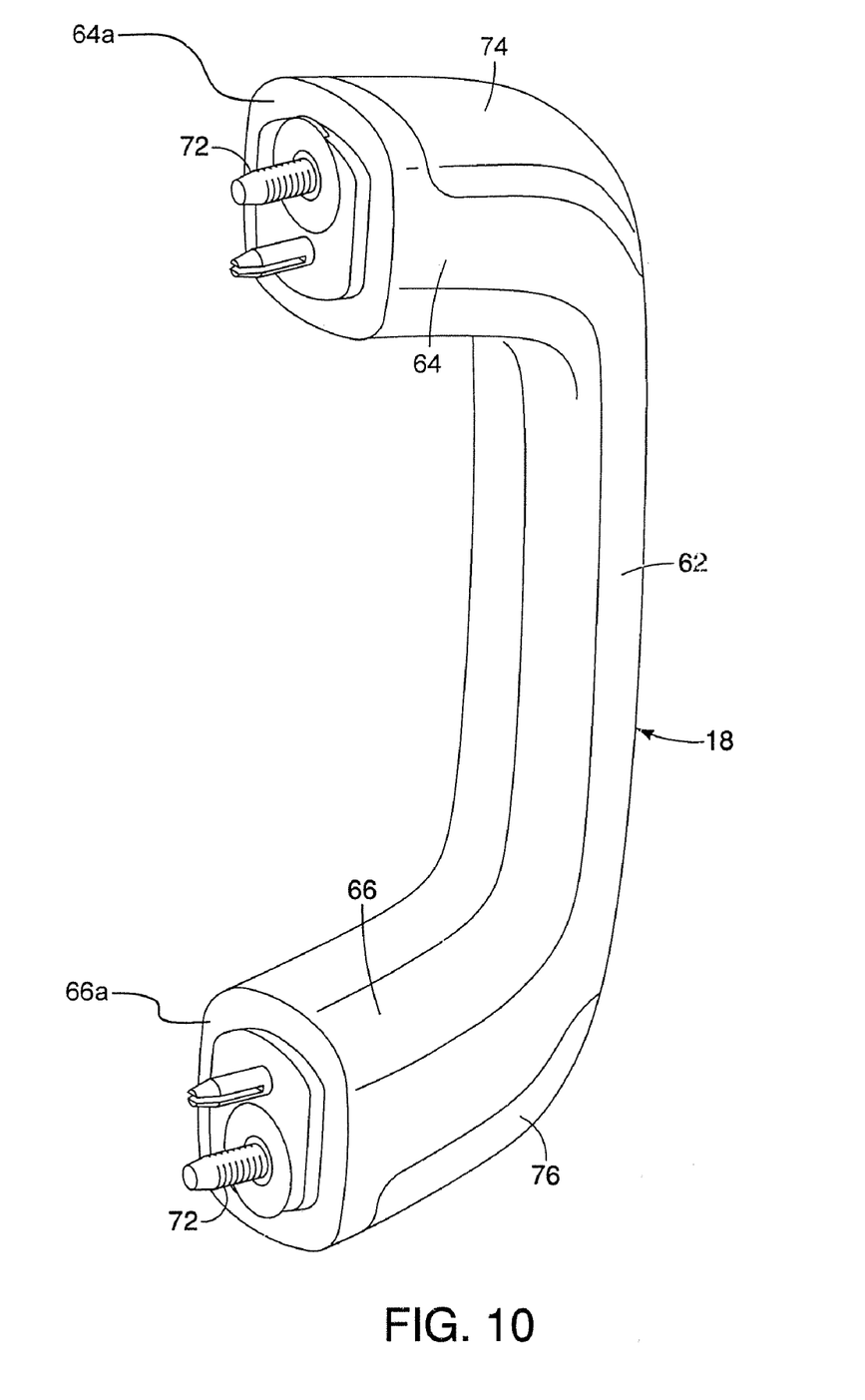
FIG. 10 is a perspective view of the assist grip handle showing the fasteners for attaching the assist grip handle to the A-pillar of the vehicle.

In the illustrated embodiment, as seen in FIGS. 9 and 10, the assist grip handle 18 includes a gripping portion 62, a first end portion 64 with a first bezel portion 64a and a second end portion 66 with a second bezel portion 66a. The gripping portion 62 and the first and second end portions 64 and 66 define a shallow U-shaped member that extends from the first and second portions 64a and 66a. As seen in FIGS. 6, 9 and 10, the first and second bezel portions 64a and 64b have a step configuration. The assist grip handle 18 is formed of a rigid material, such as a hard plastic material. In the illustrated embodiment, the gripping portion 62, the first and second bezel portions 64a and 64b and the first and second end portions 64 and 66 are formed as a one-piece, unitary member from a suitable material such as polypropylene resins. Of course, it will be apparent to those skilled in the art that the assist grip handle 18 can have other configurations, and thus the assist grip handle 18 will not be discussed and/or illustrated in detail herein.

The first end portion 64 is disposed in the first assist grip opening 44 of the trim panel 14, while the second end portion 66 is disposed in the second assist grip opening 46 of the trim panel 14. In the illustrated embodiment, the assist grip handle 18 is fixedly secured to the pillar 16 by a pair of fasteners 72 (e.g., two bolts) after the trim panel 14 is installed on the pillar 16. The fasteners 72 extend through apertures in the first and second bezel portions 64a and 66a and into respective threaded holes of the pillar 16. The assist grip handle 18 has removable caps 74 and 76 at the first and second end portions 64 and 66, respectively for accessing the fasteners 72. When the assist grip handle 18 is fixedly secured to the pillar 16, the first and second flexible trim portions 24 and 26 will bend and/or compress so as to conform to the first and second bezel portions 64a and 66a.

In this embodiment, the assist grip handle 18 is attached to the pillar 16 after the trim panel 14 is attached to the pillar 16 such that the first and second flexible trim portions 24 and 26 extend underneath the first and second end portions 64 and 66, respectively. In particular, preferably, the first flexible trim portion 24 extends underneath the first end portion 64 of the assist grip handle 18 and into a gap 84 formed between an upper bracket of the pillar 16 (e.g., the structural vehicle body section) and the stepped area of the first bezel portion 64a of the assist grip handle 18. Likewise, preferably, the second flexible trim portion 26 extends underneath the second end portion 66 of the assist grip handle 18 and into a gap 86 formed between a lower bracket of the pillar 16 (e.g., the structural vehicle body section) and the stepped area of the second bezel portion 66a of the assist grip handle 18. Thus, the first and second end portions 64 and 66 overlap with the first and second flexible trim portions 24 and 26, respectively.

In the illustrated embodiment, each of the first and second end portions 64 and 66 has a transverse width of about 37 millimeters as measured perpendicular to the longitudinal axis of the gripping portion 62. The first and second flexible trim portions 24 and 26 extend about 7.0 millimeters inwardly from the free edges of the rigid trim portion 22 with 5.0 millimeters of the first and second flexible trim portions 24 and 26 being exposed (i.e., visible from the interior of the vehicle 10) and 2.0 millimeters located in the gaps 84 and 86 that are formed between the brackets on the pillar 16 and the stepped areas of the first and second bezel portions 64a and 66a, respectively. The first and second flexible trim portions 24 and 26 can be flush with the exposed (i.e., the vehicle interior) surface of the rigid trim portion 22 or can be recessed slightly by one millimeter. Preferably, the free edges of the rigid trim portion 22 that define the first and second assist grip openings 44 and 46 of the rigid trim portion 22 slope about 7° towards the center of the openings 44 and 46 as the edges extend from the exposed surface of the trim portion 22 to the hidden backside surface of the rigid trim portion 22. Preferably, the gap hider overlaps with the hidden surface of the rigid trim portion 22 by about 2.0 millimeters. The first and second flexible trim portions 24 and 26 taper from the free edges of the rigid trim portion 22 that define the first and second assist grip openings 44 and 46 of the rigid trim portion 22 towards the free ends of the first and second flexible trim portions 24 and 26 for about 3.0 millimeters and then free ends of the first and second flexible trim portions 24 and 26 become uniform in thickness. In this way, the thicknesses of the first and second flexible trim portions 24 and 26 decrease by one millimeter in thickness and then become uniform in thickness. In other words, each of the free ends of the first and second flexible trim portions 24 and 26 has a thickness of about 3.0 millimeters at the free edge of the rigid trim portion 22 that define the corresponding one of the assist grip openings 44 and 46 of the rigid trim portion 22 and a thickness of about 2.0 millimeters at the point that is spaced about 2.0 millimeters from free edge of the rigid trim portion 22 that define the corresponding one of the assist grip openings 44 and 46 of the rigid trim portion 22 with its exposed side surface tapering between the two points. After about 2.0 millimeters from the free edge of the rigid trim portion 22 that defines the corresponding one of the assist grip openings 44 and 46 of the rigid trim portion 22, each of the first and second flexible trim portions 24 and 26 has a uniform thickness.

As seen in FIG. 1, the airbag 20 is attached to an upper region of the inner pillar portion 30 in a conventional manner. The airbag 20 is a preferably a safety device that is operatively connected in a conventional manner to sensors and/or a control device (not shown) that activates the airbag 20 in response to an impact or collision in a conventional manner. Preferably, the airbag 20 is an air curtain-type device dimensioned such that when deployed in response to vehicle impact, the airbag 20 inflates to a shape similar to an inflatable mattress or the like. As indicated in FIG. 2, once deployed, the airbag 20 takes on a rectangular like-shape forming a protective cushion between a passenger and the door and side window. It should be understood from the drawings and the description herein that the airbag 20 can also be configured to form a protective cushion between the passenger and the inner part of the roof of the vehicle 10. In other words, the specific dimensions and inflated characteristics of the airbag 20 are not limited to those depicted in FIG. 2, but can be specifically chosen depending upon the dimensions and characteristics of the vehicle 10 and requirements of current and proposed safety standards.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure. The terms of degree such as "substantially", "about" and "approximately" as used herein mean a reasonable amount of deviation of the modified term such that the end result is, not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle interior trim panel comprising:
a rigid trim portion including a vehicle interior surface, a first opening defining surface extending transverse to the vehicle interior surface and defining a first opening, and a second opening defining surface extending transverse to the vehicle interior surface and defining a second opening;
a first flexible trim portion attached to the first opening defining surface of the rigid trim portion along an edge of the first opening with the first flexible trim portion at least partially covering the first opening; and
a second flexible trim portion attached to the second opening defining surface of the rigid trim portion along an edge of the second opening with the second flexible trim portion at least partially covering the second opening.

2. The vehicle interior trim panel according to claim 1, wherein
an exterior surface of at least one of the first and second flexible trim portions is flush with the vehicle interior surface of the rigid trim portion.

3. The vehicle interior trim panel according to claim 1, wherein
an exterior surface of at least one of the first and second flexible trim portions is recessed with respect to the vehicle interior surface of the rigid trim portion.

4. The vehicle interior trim panel according to claim 1, wherein
the rigid trim portion includes a stepped configuration adjacent to the edge of at least one of the first and second openings.

5. A vehicle interior trim panel comprising:
a rigid trim portion including a first opening and a second opening;
a first flexible trim portion attached to the rigid trim portion along an edge of the first opening with the first flexible trim portion at least partially covering the first opening; and
a second flexible trim portion attached to the rigid trim portion along an edge of the second opening with the second flexible trim portion at least partially covering the second opening,
a thickness of at least one of the first and second flexible trim portions tapering from an outer section that is proximate to the edge of a corresponding one of the first and second openings of the rigid trim portion toward an inner section of the at least one of the first and second flexible trim portions having a uniform thickness.

6. The vehicle interior trim panel according to claim 5, wherein the rigid trim portion includes a stepped configuration adjacent to the edge of the corresponding one of the first and second openings.

7. A vehicle interior trim panel comprising:
a rigid trim portion including a first opening and a second opening;
a first flexible trim portion attached to the rigid trim portion along an edge of the first opening with the first flexible trim portion at least partially covering the first opening; and
a second flexible trim portion attached to the rigid trim portion along an edge of the second opening with the second flexible trim portion at least partially covering the second opening,
a thickness of an inner peripheral edge of at least one of the first and second flexible trim portions being greater than a thickness of an outer section of the at least one of the first and second flexible trim portions that is proximate to the edge of a corresponding one of the first and second openings of the rigid trim portion.

8. A vehicle interior trim panel comprising:
a rigid trim portion including a first opening, a second opening and a handle interface section that is recessed with respect to a surrounding portion of the rigid trim portion in a longitudinal direction of the vehicle interior trim panel;
a first flexible trim portion attached to the rigid trim portion along an edge of the first opening with the first flexible trim portion at least partially covering the first opening; and
a second flexible trim portion attached to the rigid trim portion along an edge of the second opening with the second flexible trim portion at least partially covering the second opening.

9. The vehicle interior trim panel according to claim 8, wherein the handle interface section is disposed between the first and second openings.

10. The vehicle interior trim panel according to claim 8, wherein the handle interface section includes a stepped configuration adjacent to the edge of at least one of the first and second openings.

11. A vehicle interior trim panel comprising:
a rigid trim portion including an assist grip opening; and
a flexible trim portion attached to the rigid trim portion along an edge of the assist grip opening with the flexible trim portion at least partially covering the assist grip opening of the rigid trim portion, an exterior surface of the flexible trim portion being flush with a vehicle interior surface of the rigid trim portion.

12. A vehicle interior trim panel comprising:
a rigid trim portion including an assist grip opening and a stepped configuration adjacent to the edge of the assist grip opening; and
a flexible trim portion attached to the rigid trim portion along an edge of the assist grip opening with the flexible trim portion at least partially covering the assist grip opening of the rigid trim portion.

13. A vehicle interior trim panel comprising:
a rigid trim portion including an assist grip opening; and
a flexible trim portion attached to the rigid trim portion along an edge of the assist grip opening with the flexible trim portion at least partially covering the assist grip opening of the rigid trim portion, an exterior surface of the flexible trim portion being recessed with respect to a vehicle interior surface of the rigid trim portion.

14. The vehicle interior trim panel according to claim 12, wherein
an exterior surface of the flexible trim portion is flush with a vehicle interior surface of the rigid trim portion.

15. The vehicle interior trim panel according to claim 11, wherein a thickness of the flexible trim portion tapers from an outer section of the flexible trim portion that is proximate to the edge of the assist grip opening toward an inner section of the flexible trim portion having a uniform thickness.

16. The vehicle interior trim panel according to claim 15, wherein
the rigid trim portion includes a stepped configuration adjacent to the edge of the assist grip opening.

17. The vehicle interior trim panel according to claim 11, wherein
a thickness of an inner peripheral edge of the flexible trim portion is greater than a thickness of an outer section of the flexible trim portion that is proximate to the edge of the assist grip opening.

18. The vehicle interior trim panel according to claim 11, wherein
the rigid trim portion includes a handle interface section that is recessed with respect to a surrounding portion of the rigid trim portion in a longitudinal direction of the vehicle interior trim panel.

19. The vehicle interior trim panel according to claim 18, wherein
the handle interface section extends from the edge of the assist grip opening.

20. The vehicle interior trim panel according to claim 18, wherein
the handle interface section includes a stepped configuration adjacent to the edge of the assist grip opening.

\* \* \* \* \*